United States Patent [19]

Hauber

[11] Patent Number: 4,682,901
[45] Date of Patent: Jul. 28, 1987

[54] BALL BEARING APPARATUS HAVING SNAP FIT FEATURE

[76] Inventor: Peter Hauber, 9001 N. Glenoaks, Sun Valley, Calif. 91352

[21] Appl. No.: 426,806

[22] Filed: Sep. 29, 1982

[51] Int. Cl.⁴ .................... F16C 43/04; F16C 13/00; F16C 33/60

[52] U.S. Cl. .................... 384/539; 384/449; 384/506

[58] Field of Search ............. 308/190, 191, 193, 195, 308/196, 188, 189 R, 182; 24/201 C, 208 R; 384/449, 492, 499, 506, 539

[56] References Cited

U.S. PATENT DOCUMENTS

| | | | |
|---|---|---|---|
| 817,292 | 4/1906 | Amann | 308/190 X |
| 2,995,405 | 8/1961 | Ferdig | 308/190 |
| 3,097,898 | 7/1963 | Ferdig | 308/190 |
| 3,360,314 | 12/1967 | DiLoreto | 308/191 X |

FOREIGN PATENT DOCUMENTS 1287376  1/1969  Fed. Rep. of Germany ...... 308/190

Primary Examiner—Stuart S. Levy
Assistant Examiner—Thomas R. Hannon
Attorney, Agent, or Firm—Louis J. Bachand

[57] ABSTRACT

A ball bearing structure comprising an outer ring and an inner ring defining a ball race. The inner ring is composed of two sections which when assembled trap the outer ring against axial separation of the rings. The inner ring sections are provided with an annular rib structure which enables their being snap-fitted together easily and inseparably, giving a long service life, low cost bearing apparatus.

10 Claims, 1 Drawing Figure

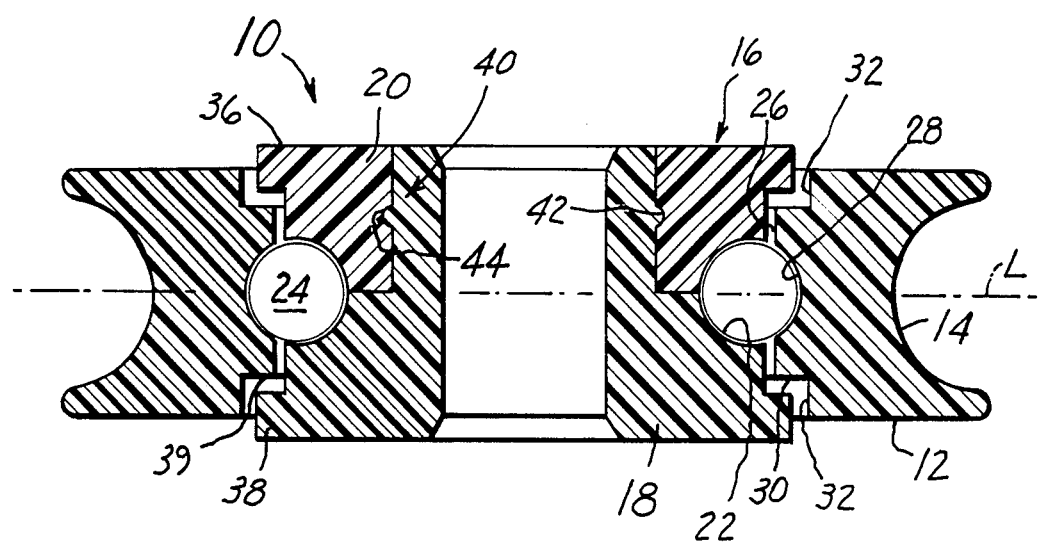

BALL BEARING APPARATUS HAVING SNAP FIT FEATURE

TECHNICAL FIELD

This invention has to do with ball bearing apparatus, and more particularly with ball bearing apparatus comprising discrete bearing elements and formed suitably of tough, self-lubricating plastics such as nylon, and which is easily permanently assembled by use of complementary rib and groove structure.

BACKGROUND ART

Ball bearings comprise discrete rolling elements such as cones or balls captured in a circular race defined by inner and outer rings, and are used to reduce friction between relatively moving machine parts in contact with the inner and outer ring respectively. Cost of manufacture including material cost and assembly, and service life are paramount considerations in design of ball bearings. While such bearing can be machined from metals, the use of plastics is dictated in many applications, and this requires improvements in ways of fastening the bearing rings together for minimum friction in the races, long service life and minimum possible assembly time and effort for lowest cost in manufacturing.

DESCRIPTION OF THE INVENTION

It is therefore an object of the invention to provide a novel ball bearing apparatus. It is another object to provide a ball bearing apparatus in which the several parts are conveniently molded of plastic such as nylon, and which simply but permanently snap together to define the ball race and surrounding ball bearing structure.

These and other objects of the invention to become apparent hereinafter are realized in accordance with the invention in a ball bearing apparatus comprising a plurality of discrete anti-friction bearing elements, and outer ring defining a first curved bearing surface on its inner periphery, an inner ring adapted to axially trap the outer ring and having first and second telescoping sections jointly defining a second curved bearing surface opposite the first bearing surface, by provision of the improvement comprising apparatus locking means comprising a radially disposed, cooperating rib and groove structure on the inner ring sections, the structure being formed coaxial and coplanar with the bearing surfaces and axially spaced therefrom, the sections being locally radially deflectable in the region of the structure in snap-fit section-joining relation at the locking structure.

In particular embodiments: the outer ring comprises a tough synthetic organic plastic and/or the inner ring sections comprise a tough synthetic organic plastic; the inner ring is generally H-shaped, the legs of the H-shape bracketing the outer ring, thus trapping the outer ring axially, and the first of the inner ring sections defining both of the legs of the H-shape on one side of the inner ring; the outer ring comprises an annulus having a dished inner periphery defining the first curved bearing surface; the inner ring comprises a two-piece, H-shaped body the legs of the H-shape bracketing the outer ring; one of the inner ring sections is T-shaped, the second of the inner ring sections complementing the first section in H-shape defining relation; the T-shaped inner ring section defines an annularly protruding rib parallel to the locus of the bearing surfaces; the complementary inner ring section defines an annular groove complementary to the annularly protruding rib and parallel to the locus of the bearing surfaces; and in which the first and second inner ring sections preferably are fabricated of nylon polymer.

THE DRAWINGS

The invention will be further described as to an illustrative embodiment in conjunction with the attached drawings in which the single FIGURE is a view in transverse cross-section of the ball bearing apparatus according to the invention.

PREFERRED MODES

Turning now the drawing in detail, a ball bearing apparatus is shown at 10 according to the invention and comprises an outer ring 12 having an outer periphery inwardly dished at 14 for mounting of the bearing, and an inner ring 16 comprising a first inner ring section 18 and a second inner ring section 20. The outer ring 12 and inner ring 16 define between them a ball race 22 in which discrete bearing elements such as balls 24 are captured. Outer ring 12 has an inner periphery 26 opposite the inner ring 16 and dished at 28 to form the outer half of the ball race 22 between shoulders 30 of the outer ring defined by annular step 32 in the outer ring. Preferably the outer ring 12 is molded in the shape shown, rather than machined.

The inner ring 16 is generally H-shaped and formed by the generally T-shaped first inner ring section 18 and the complementary second inner ring section 20. The second inner ring section 20 has an annular flange 36 congruent with the annular step 32 in the outer ring 12. The inner ring first section 18 has a like annular flange 38 also congruent with the opposed annular step 32 of the outer ring 12. The annular flanges 36, 38 appear in cross-section as the legs of an H, and as can be seen these flanges bracket the inner peripheral portion 39 of the outer ring 12. Thus the outer ring 12 cannot pass the inner ring 16 axially.

The first and second sections 18, 20 of the inner ring 16 cooperate to define the inner wall of the ball race 22 opposite the dished portion 28 of outer ring inner periphery 26.

To assemble and maintain assembled the several ring and ring sections 12, 18 and 20 of the bearing apparatus, provision is made for snap-fitting the inner ring first and second sections together. The means provided is a cooperating ring and groove structure 40 comprising an outwardly protruding annular rib 42 formed integrally with the inner ring second section 18 parallel with the locus L of the ball race 22 and axially spaced therefrom as shown. A complementary groove 44 opposes the rib 42 in the first section 18 of the inner ring 16. The rib and groove 42, 44 are proportioned to fit snugly and shaped to have mating, gently sloped surfaces, as shown whereby the rib will slip into the groove more easily than slip out. Easy interfitment is aided by the natural lubricity of nylon material where used, and the resilience of the parts which enables the slight deflection to bypass the interference at the meeting of the rib 42 and groove 44, effecting a snap fit, which is secure against separation of the sections 18, 20, but easily made during assembly. Once assembled, the inner ring sections 18, 20 complete the inner ring 14 and as seen block axial separation of the outer ring from the inner ring. The groove 44 can be placed on the section 18, and the rib 42 on the section 20, rather than reversed as shown.

Preferably the inner ring 16 sections 18, 20 are molded of nylon polymer, or one or another of the engineering plastics which are tough, have high modulus values and are readily moldable, e.g. Delrin ®, Phenoxy ® and polycarbonate resins and like synthetic organic polymeric materials, preferable thermoplastic.

Thus the objects of the invention are realized, a bearing apparatus which is easy to assemble, readily formed of plastic parts and durable in use.

I claim:

1. In ball bearing apparatus comprising a plurality of discrete anti-friction bearing elements, an outer ring defining a first curved bearing surface on its inner periphery, and an inner ring adapted to axially trap said outer ring and having a first section of an inside diameter adapted to encircle and engage a shaft and a second section of relatively larger diameter and adapted to encircle said first section encircling said shaft and without engaging said shaft said sections jointly defining a second curved bearing surface opposite said first bearing surface, apparatus locking means comprising a radially disposed, cooperating rib and groove structure on said inner ring sections, said structure being formed coaxial and parallel to the locus of said bearing surfaces and axially spaced therefrom, said sections being locally radially deflectable in the region of said structure in snap-fit section-joining relation at said locking structure.

2. Ball bearing apparatus according to claim 1, in which said outer ring comprises a tough synthetic organic plastic.

3. Ball bearing apparatus according to claim 1, in which an inner ring section comprises a tough synthetic organic plastic.

4. Ball bearing apparatus according to claim 1, in which said inner ring is generally H-shaped, the legs of said H-shape bracketing said outer ring, and the first of said inner ring sections defining both of the legs of said H-shape on one side of said inner ring.

5. Ball bearing apparatus according to claim 1, in which said outer ring comprises an annulus having a dished inner periphery defining said first curved bearing surface.

6. Ball bearing apparatus according to claim 5, in which said inner ring comprises a two-piece, H-shaped body the legs of said H-shape bracketing said outer ring.

7. Ball bearing apparatus according to claim 6, in which one of said inner ring sections is T-shaped, the second of said inner ring sections complementing said first section in H-shape defining relation.

8. Ball bearing apparatus according to claim 7, in which said T-shaped inner ring section defines an annularly protruding rib parallel to the locus of said bearing surfaces.

9. Ball bearing apparatus according to claim 8, in which said complementary inner ring section defines an annular groove complementary to said annularly protruding rib and parallel to the locus of said bearing surfaces.

10. Ball bearing apparatus according to claim 9, in which said first and second inner ring sections are fabricated of nylon polymer.

* * * * *